United States Patent
Min et al.

(10) Patent No.: US 8,497,961 B2
(45) Date of Patent: Jul. 30, 2013

(54) LIQUID CRYSTAL DISPLAY DEVICE AND METHOD OF MANUFACTURING THE SAME

(75) Inventors: Byung-Chan Min, Yongin (KR); Hyoung-Sik Moon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 270 days.

(21) Appl. No.: 12/931,478

(22) Filed: Feb. 1, 2011

(65) Prior Publication Data
US 2011/0249224 A1 Oct. 13, 2011

(30) Foreign Application Priority Data

Apr. 13, 2010 (KR) .................. 10-2010-0033904

(51) Int. Cl.
G02F 1/1337 (2006.01)
G02F 1/1335 (2006.01)

(52) U.S. Cl.
USPC .......................................... 349/128; 349/117

(58) Field of Classification Search
USPC ..................... 349/103, 117, 128, 180
See application file for complete search history.

(56) References Cited

U.S. PATENT DOCUMENTS

2008/0158488 A1* 7/2008 Yanai et al. ............... 349/107
2008/0252820 A1* 10/2008 Ban .............................. 349/75

FOREIGN PATENT DOCUMENTS

| KR | 10-2000-0051644 A | 8/2000 |
| KR | 10-2006-00894040 A | 8/2006 |
| KR | 10-2007-0028929 A | 3/2007 |

* cited by examiner

*Primary Examiner* — James Dudek
(74) *Attorney, Agent, or Firm* — Christie, Parker & Hale, LLP (57) ABSTRACT

A liquid crystal display device is provided that has improved compensation using a single type of wide view film. The liquid crystal display device includes a first substrate including a thin film transistor (TFT); a second substrate including a color filter; a first liquid crystal layer between the first and second substrates and including a plurality of pole-shaped liquid crystal molecules twisted in a first direction; a second liquid crystal layer including a plurality of disk-type liquid crystal molecules arranged to perform wide view compensation matching with the plurality of pole-shaped liquid crystal molecules; wherein a first rubbing direction of a first alignment layer and a second rubbing direction of a second alignment layer cross at a crossing angle greater than about 90 degrees and less than or equal to about 94 degrees.

6 Claims, 6 Drawing Sheets

LIQUID CRYSTAL DISPLAY DEVICE AND METHOD OF MANUFACTURING THE SAME

CROSS-REFERENCE TO RELATED APPLICATION

This application claims priority to and the benefit of Korean Patent Application No. 10-2010-0033904, filed on Apr. 13, 2010, in the Korean Intellectual Property Office, the entire contents of which is incorporated herein by reference.

BACKGROUND

1. Field

The following description relates to a liquid crystal display device and a method of manufacturing the liquid crystal display device, and more particularly, to a liquid crystal display device including a wide view film (WVF) and a method of manufacturing the liquid crystal display device.

2. Description of the Related Art

A liquid crystal display device generally includes a first substrate including a thin film transistor (TFT) for driving respective pixel regions, a second substrate disposed to face the first substrate and including a color filter (CF) used to implement a color, and a liquid crystal layer disposed between the first substrate and the second substrate. Thus, if an appropriate voltage is applied between the first substrate and the second substrate by driving the TFT, liquid crystal molecules of the liquid crystal layer are rearranged, and a transmittance of a backlight is adjusted, thereby controlling an amount of light transmitted through the CF and forming an image having a desired color.

Liquid crystal layers are often twisted nematic (TN) liquid crystal layers, in which liquid crystal molecules are twisted and arranged in a direction. TN liquid crystal layers are classified as either left handed (LH) liquid crystal layers, in which liquid crystal molecules thereof are twisted counterclockwise from the first substrate to the second substrate, or right handed (RH) liquid crystal layers, in which liquid crystal molecules thereof are twisted clockwise from the first substrate to the second substrate.

However, in TN liquid crystal layers, liquid crystal molecules having long shapes, (e.g. poles), transmit light in only axial directions of the long shaped liquid crystal molecules, and, thus images formed by TN liquid crystal layers have very narrow view angles. That is, when a screen is viewed in front thereof, the screen has an intended color, whereas if the screen is viewed at even a slight angle, the screen has a color quite different from its intended color (even black and white colors may be switched, such as a film image). A backlight may be utilized to emit in limited directions according to pole-shaped liquid crystal molecules of TN liquid crystal layers, but view angles are still limited.

Accordingly, there is a recent preference for a wide view film (WVF) attached to upper and lower portions of TN liquid crystal layers in order to widen view angles. The WVF includes a discotic liquid crystal layer in which disk-type liquid crystal molecules are arranged. Such disk-type liquid crystal molecules are capable of transmitting a backlight in a radius direction perpendicular to axial directions of the disk-type liquid crystal molecules. Thus, in combination, the pole-shaped liquid crystal molecules (which transmit light in an axial direction) and the disk-type liquid crystal molecules of discotic liquid crystal layers (which transmit light in a semi-diameter direction) compensate for directions in which a backlight is transmitted, thereby increasing a view angle.

However, discotic liquid crystal layers included in WVFs are designed to compensate for LH liquid crystal layers or RH liquid crystal layers among TN liquid crystal layers. More specifically, a wide view angle is obtained through an accurate crossing-compensation only when optical axes of pole-shaped liquid crystal molecules and optical axes of disk-type liquid crystal molecules are arranged in parallel to each other. However, since LH liquid crystal layers and RH liquid crystal layers have different directions to which liquid crystal layers are arranged, if discotic liquid crystal layers formed for LH liquid crystal layers are arranged on LH liquid crystal layers in order to compensate for the LH liquid crystal layers, the LH liquid crystal layers are compensated, but the RH liquid crystal layers covered with the discotic liquid crystal layers formed for LH crystal layers are not compensated. Thus, it is necessary to separately manufacture WVFs for LH liquid crystal layers and WVFs for RH liquid crystal layers and to manage the WVFs according to types of liquid crystal layers, which involves manufacturing of WVFs according to different types of liquid crystal layers, and a complicated management of parts. Accordingly, a method of obtaining an excellent compensation effect from LH liquid crystal layers and RH liquid crystal layers using a single type of WVF is needed.

SUMMARY

Aspects of embodiments of the present invention are directed toward a liquid crystal display device that is improved to obtain an excellent wide view compensation effect from a left handed (LH) liquid crystal layer and a right handed (RH) liquid crystal layer using the same wide view film (WVF), and a method of manufacturing the liquid crystal display device.

Additional aspects will be set forth in part in the description which follows and, in part, will be apparent from the description, or may be learned by practice of the presented embodiments.

According to one or more embodiments of the present invention, a liquid crystal display device is provided, the liquid crystal display device including: a first substrate including a thin film transistor (TFT); a second substrate including a color filter; a first liquid crystal layer between the first substrate and the second substrate and including a plurality of pole-shaped liquid crystal molecules twisted in a first direction; a second liquid crystal layer including a plurality of disk-type liquid crystal molecules arranged to perform wide view compensation matching with the plurality of pole-shaped liquid crystal molecules; a first alignment layer between the first liquid crystal layer and the first substrate; and a second alignment layer between the first liquid crystal layer and the second substrate, wherein a first rubbing direction of the first alignment layer and a second rubbing direction of the second alignment layer cross at a crossing angle greater than about 90 degrees and less than or equal to about 94 degrees.

In one embodiment, the crossing angle is between the first and second rubbing directions with respect to a main view direction.

In one embodiment, the second liquid crystal layer is designed to perform compensation matching with respect to the first liquid crystal layer twisted in a second direction opposite to the first direction at the crossing angle of 90 degrees.

In one embodiment, the first liquid crystal layer is a right handed (RH) liquid crystal layer in which a plurality of liquid crystal molecules are twisted clockwise from the first substrate to the second substrate.

In one embodiment, the liquid crystal display device further includes: wide view films (WVFs) attached to outer surfaces of the first substrate and the second substrate, wherein each of WVFs include the second liquid crystal layer.

In one embodiment, the liquid crystal display device further includes: a WVF attached to an outer surface of either the first substrate or the second substrate, wherein the WVF includes the second liquid crystal layer.

According to one or more embodiments of the present invention, a method of manufacturing a liquid crystal display device, the method including: rubbing a first alignment layer disposed on a first substrate including a thin film transistor (TFT) in a first rubbing direction and a second alignment layer disposed on a second substrate including a color filter in a second rubbing direction; twisting and aligning a plurality of pole-shaped liquid crystal molecules in a first direction along the first rubbing direction of the first alignment layer and the second rubbing direction of the second alignment layer to form a first liquid crystal display layer; and forming a second liquid crystal display layer including a plurality of disk-type liquid crystal display molecules arranged to perform wide view compensation matching with the plurality of pole-shaped liquid crystal molecules, wherein the rubbing includes: rubbing the first alignment layer in the first rubbing direction and rubbing the second alignment layer in the second rubbing direction that crosses the first rubbing direction at a crossing angle greater than about 90 degrees and less than or equal to about 94 degrees.

In one embodiment, the crossing angle is between the first and second rubbing directions with respect to a main view direction.

In one embodiment, the second liquid crystal layer is designed to perform compensation matching with respect to the first liquid crystal layer twisted in a second direction opposite to the first direction at the crossing angle of 90 degrees.

In one embodiment, the first liquid crystal layer is a right handed (RH) liquid crystal layer in which a plurality of liquid crystal molecules are twisted clockwise from the first substrate to the second substrate.

In one embodiment, the method further includes: attaching wide view films (WVFs) to outer surfaces of the first substrate and the second substrate, wherein the WVFs include the second liquid crystal layer.

In one embodiment, the method further includes: attaching a WVF to an outer surface of either the first substrate or the second substrate, wherein the WVF includes the second liquid crystal layer.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1:
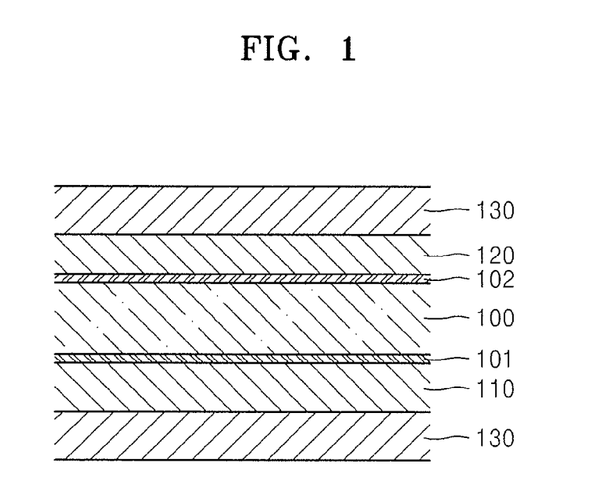
FIG. 1 is a cross-sectional view of a liquid crystal display device according to an embodiment of the present invention.

FIG. 1 is a cross-sectional view of a liquid crystal display device according to an embodiment of the present invention.

Referring to FIG. 1, the liquid crystal display device of the present embodiment includes a first substrate 110 including a thin film transistor, a second substrate 120 including a color filter, a twisted nematic (TN) liquid crystal layer 100 (hereinafter referred to as a first liquid crystal layer) disposed between the first substrate 110 and the second substrate 120, and wide view films (WVFs) 130 attached to outer surfaces of the first substrate 110 and the second substrate 120.

The first liquid crystal layer 100 includes a plurality of pole-shaped liquid crystal molecules 100a (refer to FIG. 2B) that are twisted clockwise from the first substrate 110 to the second substrate 120. That is, in one embodiment, the first liquid crystal layer 100 is a right handed (RH) liquid crystal layer. The WVFs 130 include a discotic liquid crystal layer 131 (hereinafter referred to as a second liquid crystal layer) that includes a plurality of disk-type liquid crystal molecules 131a (refer to FIG. 2B) that are arranged to perform wide view compensation matching with the pole-shaped liquid crystal molecules 100a of the first liquid crystal layer 100. The disk-type liquid crystal molecules 131a of the second liquid crystal layer 131 are manufactured to perform wide view compensation with respect to left handed (LH) liquid crystal layers, and not RH liquid crystal layers, such as the first liquid crystal layer 100. More specifically, although the first liquid crystal layer 100 is an RH liquid crystal layer in the present embodiment, by improving compatibility between parts, wide view compensation may be performed by applying the second liquid crystal layer 131 formed for LH liquid crystal layers to the first liquid crystal layer 100. Thus, when the first liquid crystal layer 100 is an LH liquid crystal layer, the second liquid crystal layer 131 is designed for and can also be utilized to perform wide view compensation.

Figure 2A:
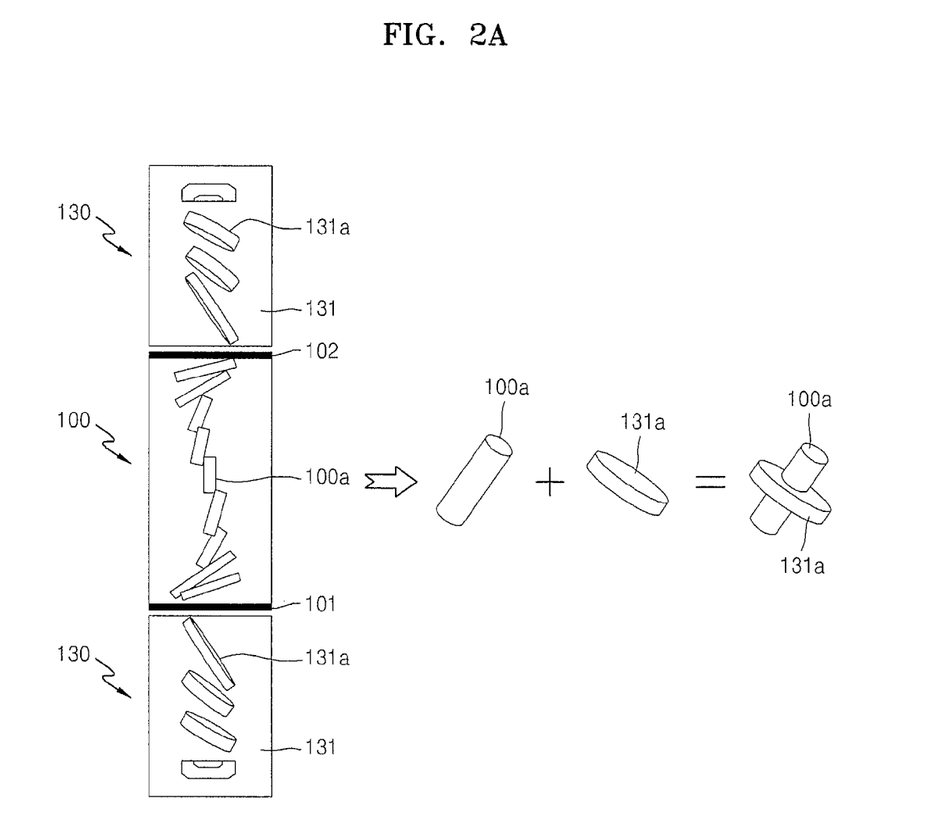
FIGS. 2A and 2B are diagrams for showing a wide view compensation principle of a left handed (LH) first liquid crystal layer and a right handed (RH) first liquid crystal layer, respectively.
Figure 2B:
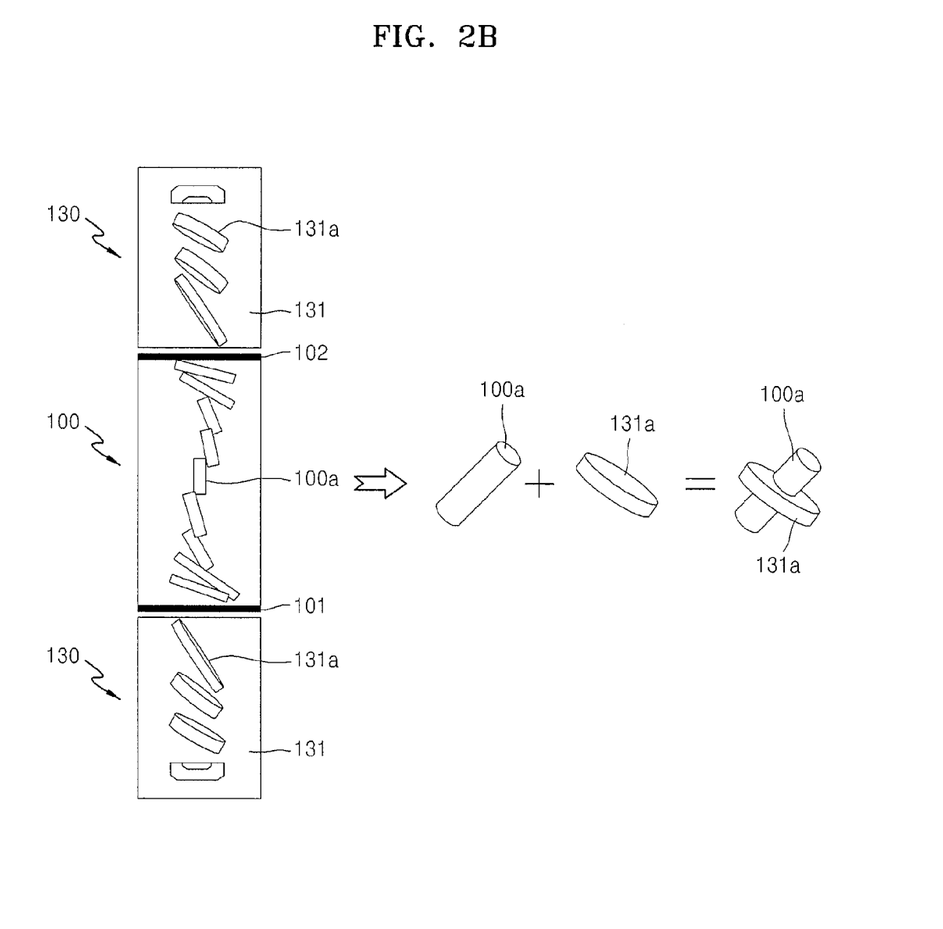

A compensation principle is schematically shown with reference to FIGS. 2A and 2B. Referring to FIG. 2A, when the first liquid crystal layer is an LH liquid crystal layer, since the second liquid crystal layer 131 of the WVFs 130 is designed for LH liquid crystal layers, optical axes of the pole-shaped liquid crystal molecules 100a of the first liquid crystal layer 100 and optical axes of the disk-type liquid crystal molecules 131a of the second liquid crystal layer 131 are in parallel to each other, and thus a view angle is widen. That is, since the pole-shaped liquid crystal molecules 100a transmit light in an axial direction, and the disk-type liquid crystal molecules 131a transmit light in a radial direction, light is transmitted by the pole-shaped liquid crystal molecules 100a and the disk-type liquid crystal molecules 131a in directions that cross each other (e.g. perpendicularly or non-perpendicularly), and thus a wide view angle is obtained. A first alignment layer 101 adjacent to the first substrate 110 of the first liquid crystal layer 100 and a second alignment layer 102 adjacent to the second substrate 120 of the first liquid crystal layer 100 are rubbed in directions different to each other by 90 degrees. That is, the rubbing directions of the first alignment layer 101 and the second alignment layer 102 are perpendicular to each other in order to form the first liquid crystal layer 100, thereby twisting the liquid crystal molecules. Thus, the disk-type liquid crystal molecules 131a included in the second liquid crystal layer 131 of the WVFs 130 may match the alignment of the pole-shaped liquid crystal molecules 100a.

However, if the second liquid crystal layer 131, which is designed to match (or coordinate with) the alignment of LH liquid crystal layers, is used with an RH liquid crystal layer as shown in FIG. 2B, instead of an LH liquid crystal layer, since the optical axes of the pole-shaped liquid crystal molecules 100a of the first liquid crystal layer 100 and the optical axes of the disk-type liquid crystal molecules 131a of the second liquid crystal layer 131 are not parallel to each other, wide view compensation may not be sufficiently performed.

Figure 3A:
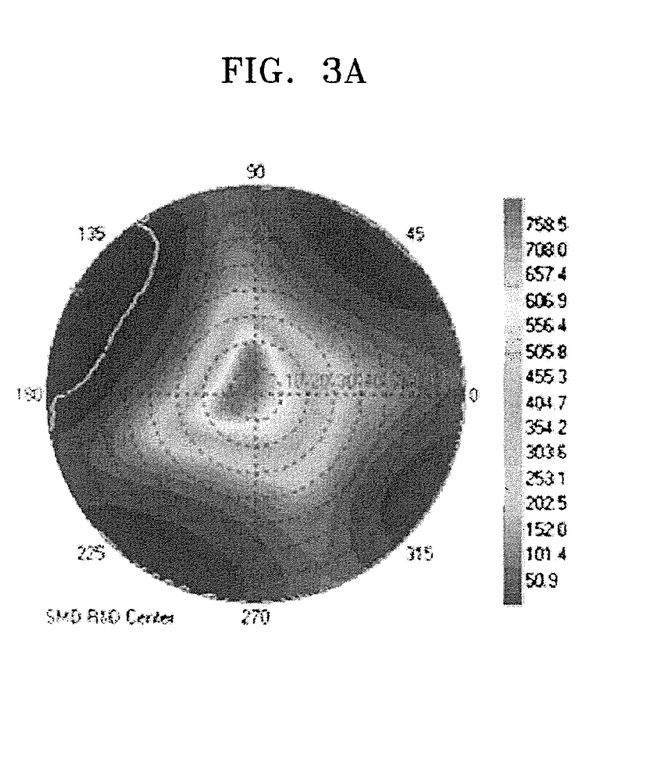
FIGS. 3A and 3B are graphs showing the characteristics of a view angle obtained from FIGS. 2A and 2B, respectively.
Figure 3B:
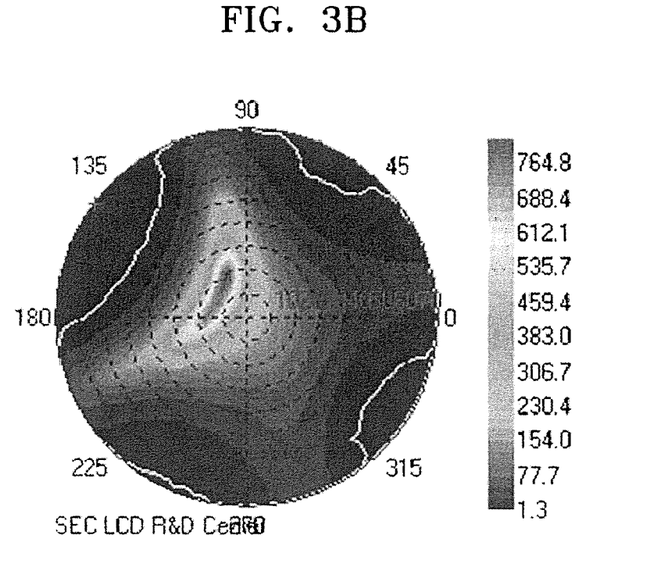

The characteristics of a view angle under the above conditions are measured as shown in FIGS. 3A and 3B. Referring to FIG. 3A, the characteristics of the view angle are measured when the first liquid crystal layer 100, is an LH liquid crystal layer and the second liquid crystal layer 131 is designed to match the alignment of LH liquid crystal layers, as shown in FIG. 2A. Referring to FIG. 3B, the characteristics of the view angle are measured under no improvement condition, wherein the first liquid crystal layer 100 is an RH liquid crystal layer and the second liquid crystal layer 131 is designed to match the alignment of LH liquid crystal layers as shown in FIG. 2B. The measured characteristics of the view angle indicate contrast ratios (hereinafter referred to as CRs), wherein CRs are values of a white luminance/black luminance for a corresponding view angle. A high CR value indicates a good comparison of black and white, which means a good implementation of color. A low CR value indicates a bad comparison of black and white, which means a bad implementation of color. Referring to FIG. 3A, high CR values are gathered around a center point, i.e., around a view angle of 0 degrees, which corresponds to being in front of a screen, and similar CR values are uniformly distributed therearound, which means that a wide view compensation is well performed between the first liquid crystal layer 100 and the second liquid crystal layer 120. However, referring to FIG. 3B, high CR values are not gathered around the center point and are inclined to the left of the center point. That is, color is clearer when viewing the screen from a position to the left of the front thereof, which means that a wide view compensation is not well performed between the first liquid crystal layer 100 and the second liquid crystal layer 131. This poor compensation results from the first liquid crystal layer 100 being an RH liquid crystal layer and the second liquid crystal layer 131 formed for LH liquid crystal layers.

However, the wide view compensation is well performed by adjusting the rubbing direction of the first liquid crystal layer 100 in the present embodiment even though the first liquid crystal layer 100, that is, an RH liquid crystal layer, and the second liquid crystal layer 131, formed for LH liquid crystal layers, are used in the present embodiment.

Figure 4:
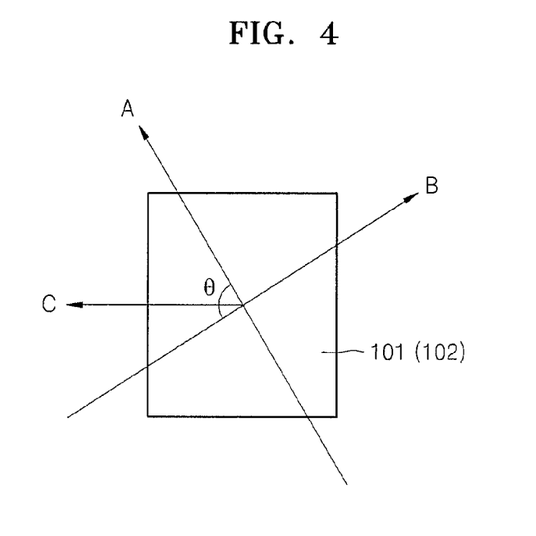
FIG. 4 shows an improved rubbing direction of a liquid crystal display device according to an embodiment of the present invention.

More specifically, as described above with reference to FIG. 1, the first liquid crystal layer 100 includes liquid crystal molecules that are aligned, and the first alignment layer 101 and the second alignment layer 102 are rubbed in directions perpendicular to each other. In the present embodiment, the rubbing directions are set to cross each other at an angle greater than 90 degrees and less than or equal to 94 degrees as shown in FIG. 4. Referring to FIG. 4, a top view of the liquid crystal display device of FIG. 1 is shown in order to explain the rubbing directions. A first rubbing direction A of the first alignment layer 101 and a second rubbing direction B of the second alignment layer 102 are not perpendicular to each other, but cross at a crossing angle θ, wherein θ is greater than 90 degrees. In this case, the pole-shaped liquid crystal molecules 100a are not twisted by 90 degrees, but are twisted at an angle greater than 90 degrees and less than or equal to 94 degrees. As such, the wide view compensation is well performed even though the first liquid crystal layer 100 is an RH liquid crystal layer and the second liquid crystal layer 131 is formed for LH liquid crystal layers. It is estimated that a change in a twisting angle of the first liquid crystal layer 100 will result in better matching between the second liquid crystal layer 131 formed for LH liquid crystal layers and the first liquid crystal layer 100 formed as an RH liquid crystal layer. Here, a range of the crossing angle at which the rubbing directions cross for an appropriate improvement is obtained through the following experimentation.

A direction C denotes a main view direction. A phenomenon in which black and white colors are switched like a film image essentially occurs at the main view direction. The main view direction is designed as an angle by which a screen is not most viewed by a viewer. The crossing angle θ indicates an angle between the first and second rubbing directions with respect to the main view direction C.

Figure 5A:
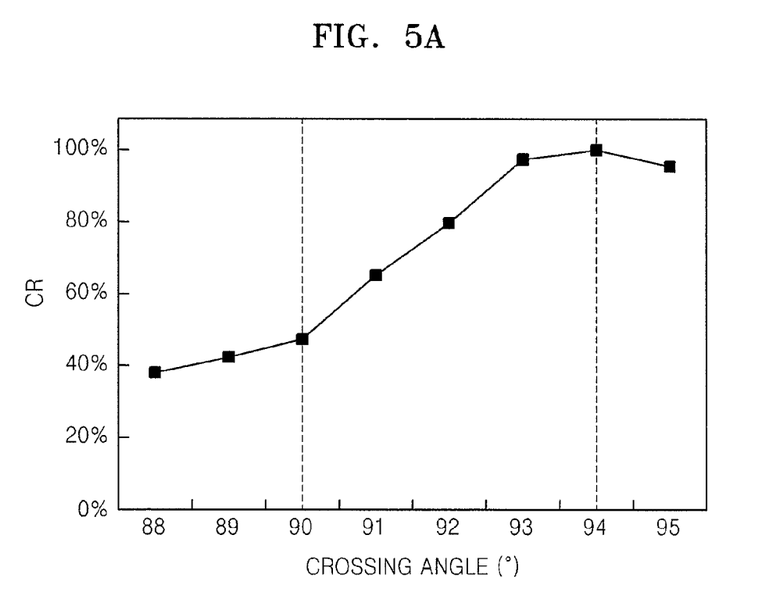
FIGS. 5A and 5B are graphs showing the characteristics of a wide view angle according to the improved rubbing direction of FIG. 4.
Figure 5B:
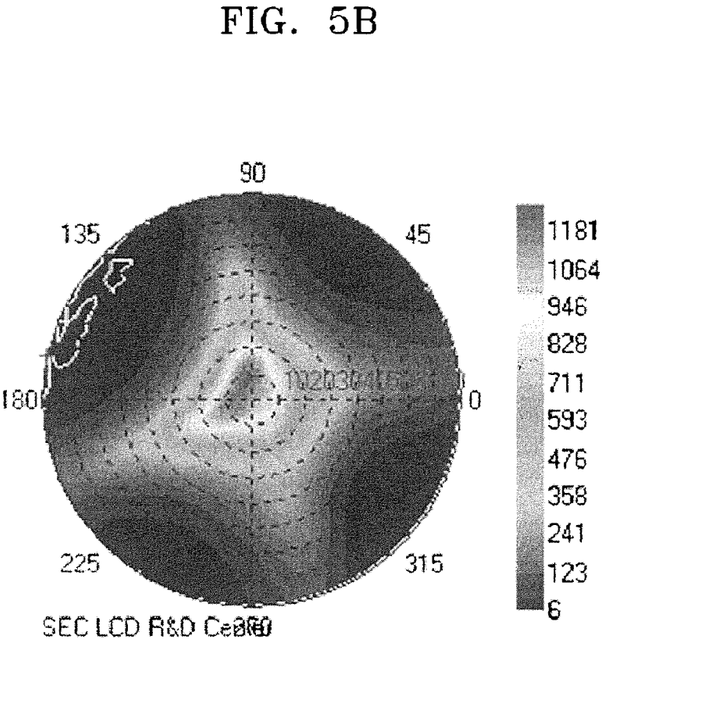

Experimental results are shown in graphs of FIGS. 5A and 5B.

Referring to FIG. 5A, a CR is measured at a center point while varying a crossing angle θ between the first and second rubbing directions (A, B, respectively) from about 88 degrees to about 95 degrees. The graph of FIG. 5A shows that if the crossing angle θ between the first and second rubbing directions of the first alignment layer 101 and the second alignment layer 102 exceeds 90 degrees, the CR is rapidly improved, and the CR peaks when the crossing angle θ is 94 degrees. Thus, the characteristics of a view angle are greatly improved when the crossing angle θ is greater than about 90 degrees and less than or equal to about 94 degrees.

Referring to FIG. 5B, CRs are measured in front and in various directions of a screen at an inclined angle as shown in FIG. 3B. Although high CR values are inclined to the left in FIG. 3B, high CR values are located in a center portion, and CR values are uniformly distributed therearound after the crossing angle θ between the first and second rubbing directions (A, B, respectively) is adjusted in FIG. 5B. This means that a wide view compensation is well performed. Adjustment of the crossing angle θ between the first and second rubbing directions results in excellent matching of RH liquid crystal layers and the WVFs 130 for LH liquid crystal layers.

The liquid crystal display device may be manufactured as presented below.

The first alignment layer 101 and the second alignment layers 102 are rubbed to each other. A crossing angle between the first and second rubbing directions is greater than about 90 degrees and less than or equal to about 94 degrees as described above Pole-shaped liquid crystal molecules are twisted clockwise along the rubbing directions and aligned to form the first liquid crystal layer 100. That is, an RH liquid crystal layer is formed.

Thereafter, the WVFs 130 including the second liquid crystal layer 131 are attached to the outer surfaces of the first substrate 110 and the second substrate 120. The disk-type liquid crystal molecules 131a of the second liquid crystal layer 131 are matched well with LH liquid crystal layers.

The liquid crystal display device manufactured according to an embodiment of the present invention, as described above, may have an improved wide view angle by adjusting the crossing angle between the rubbing directions as shown in FIGS. 5A and 5B.

If the first liquid crystal layer 100 is an LH liquid crystal layer, the crossing angle is set at 90 degrees when rubbing the first alignment layer 101 and the second alignment layers 102, and the WVFs 130 are used.

A liquid crystal display device of the present embodiment uses a single type of WVFs for RH liquid crystal layers and LH liquid crystal layers, thereby improving compatibility of parts and reducing manufacturing and management loads of parts.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display device comprising:
   a first substrate comprising a thin film transistor (TFT);
   a second substrate comprising a color filter;
   a first liquid crystal layer between the first substrate and the second substrate and comprising a plurality of pole-shaped liquid crystal molecules twisted in a first direction;
   a second liquid crystal layer on either the first substrate or the second substrate, the second liquid crystal layer comprising a plurality of disk-type liquid crystal molecules arranged to perform wide view compensation matching with the plurality of pole-shaped liquid crystal molecules;
   a first alignment layer between the first liquid crystal layer and the first substrate; and
   a second alignment layer between the first liquid crystal layer and the second substrate,
   wherein a first rubbing direction of the first alignment layer and a second rubbing direction of the second alignment layer cross at a crossing angle greater than about 90 degrees and less than or equal to about 94 degrees.

2. The liquid crystal display device of claim 1, wherein the crossing angle is between the first and second rubbing directions with respect to a main view direction.

3. The liquid crystal display device of claim 1, wherein the second liquid crystal layer is designed to perform compensation matching with respect to the first liquid crystal layer twisted in a second direction opposite to the first direction at the crossing angle of 90 degrees.

4. The liquid crystal display device of claim 1, wherein the first liquid crystal layer is a right handed (RH) liquid crystal layer in which a plurality of liquid crystal molecules are twisted clockwise from the first substrate to the second substrate.

5. The liquid crystal display device of claim 1, further comprising: wide view films (WVFs) attached to outer surfaces of the first substrate and the second substrate,
   wherein the WVFs comprise the second liquid crystal layer.

6. The liquid crystal display device of claim 1, further comprising: a WVF attached to an outer surface of either the first substrate or the second substrate,
   wherein the WVF comprises the second liquid crystal layer.

* * * * *

UNITED STATES PATENT AND TRADEMARK OFFICE
CERTIFICATE OF CORRECTION

| | |
|---|---|
| PATENT NO. | : 8,497,961 B2 |
| APPLICATION NO. | : 12/931478 |
| DATED | : July 30, 2013 |
| INVENTOR(S) | : Byung-Chan Min et al. |

It is certified that error appears in the above-identified patent and that said Letters Patent is hereby corrected as shown below:

On the Title Page

(56) References Cited, FOREIGN PATENT DOCUMENTS, line 2

Delete "KR 10-2006-00894040 A"
Insert -- KR 10-2006-0089402 A --

Signed and Sealed this
Twenty-sixth Day of August, 2014

Michelle K. Lee
*Deputy Director of the United States Patent and Trademark Office*